United States Patent [19]

Donner

[11] Patent Number: 5,203,003
[45] Date of Patent: Apr. 13, 1993

[54] COMPUTER ARCHITECTURE FOR CONSERVING POWER BY USING SHARED RESOURCES AND METHOD FOR SUSPENDING PROCESSOR EXECUTION IN PIPELINE

[75] Inventor: Robert W. Donner, Scotts Valley, Calif.

[73] Assignee: Echelon Corporation, Palo Alto, Calif.

[21] Appl. No.: 677,648

[22] Filed: Mar. 28, 1991

[51] Int. Cl.$^5$ .................. G06F 9/28; G06F 9/38
[52] U.S. Cl. ...................... 395/800; 364/707; 364/DIG. 1; 364/273.1; 364/231.8; 364/228.1; 364/230; 364/247; 395/750; 395/375; 395/575
[58] Field of Search ............... 395/800, 725, 750, 375, 395/575; 364/707

[56] References Cited

U.S. PATENT DOCUMENTS

| | | | |
|---|---|---|---|
| 4,203,153 | 5/1980 | Boyd | 364/200 |
| 4,316,247 | 2/1982 | Iwamoto | 364/200 |
| 4,479,191 | 10/1984 | Nojima et al. | 364/900 |
| 4,545,030 | 10/1985 | Kitchin | 364/900 |
| 4,615,005 | 9/1986 | Maejima et al. | 364/200 |
| 4,847,755 | 7/1989 | Morrison et al. | 395/800 |
| 4,851,987 | 7/1989 | Day | 364/200 |
| 4,980,836 | 12/1990 | Carter et al. | 364/200 |
| 4,982,402 | 1/1991 | Beaven et al. | 364/200 |
| 5,063,497 | 11/1991 | Cutler et al. | 395/800 |
| 5,097,413 | 3/1992 | Mensch, Jr. | 395/775 |

OTHER PUBLICATIONS

Philip Smith, K. Raghunatan and Jerry Hewell, "C-MOS microprocessor wakes itself up", Electronics, Sep. 1980, pp. 123-126.

*Primary Examiner*—Thomas C. Lee
*Assistant Examiner*—Mehmet Geckil
*Attorney, Agent, or Firm*—Blakely, Sokoloff, Taylor & Zafman

[57] ABSTRACT

A computer architecture and method capable of retaining data after a system clock has been halted to conserve power. The computer comprises first processing circuitry, the first circuitry comprising dynamic components. The dynamic components include such devices as intermediate pipeline registers, arithmetic logic units, address generators, and instruction decode and control circuitry. The computer further comprises second processing circuitry, the second circuitry comprising static components. In a preferred embodiment, the static components comprise instruction registers, stop controls, general purpose registers, status registers, and random access memory. The use of dynamic components in the architecture of a preferred embodiment maximizes cost and size considerations, while the static components allows instruction execution and the system clock to be halted. The combination of dynamic and static components preserves information which enables the system to resume execution after the system clock has been stopped without data loss. This architecture reduces power consumption compared to a system implemented entirely in dynamic logic, while minimizing cost and area. Methods are also provided to stop this architecture and restart it without data loss.

5 Claims, 7 Drawing Sheets

Pipeline Data Contents

|  | Time Period 1 | Time Period 2 | Time Period 3 | Time Period 4 | Time Period 5 | Time Period 6 |
|---|---|---|---|---|---|---|
| Stage 1 Pipeline | CPU 1 | CPU 2 | CPU 3 | CPU 1 | CPU 2 | CPU 3 |
| Stage 2 Pipeline | CPU 3 | CPU 1 | CPU 2 | CPU 3 | CPU 1 | CPU 2 |
| Stage 3 Pipeline | CPU 2 | CPU 3 | CPU 1 | CPU 2 | CPU 3 | CPU 1 |

Figure 2

COMPUTER ARCHITECTURE FOR CONSERVING POWER BY USING SHARED RESOURCES AND METHOD FOR SUSPENDING PROCESSOR EXECUTION IN PIPELINE

BACKGROUND OF THE INVENTION

1. Field of the Invention

The present invention relates to a computer architecture and method which can conserve power. More particularly, this invention relates to an architecture which allows a computer to suspend operation for a period of time and resume operation later in order to conserve overall power consumption.

2. Background Information

In certain applications like control systems, microprocessors are used for real-time monitoring and control. Information is typically sampled and updated continuously and the computer system executes instructions at maximum speed. Usually, sufficient power is available to the computer in order to continue execution at all times. Power consumption is generally a secondary consideration to these real-time monitoring and control functions. Therefore, these types of systems have typically been implemented using TTL (transistor-transistor logic) dynamic logic devices instead of CMOS (charged metal oxide semiconductor) static logic devices because dynamic devices require less area, are cheaper, and operate sufficiently fast for most real-time applications.

In other applications, continuous real-time monitoring and control is not required. In some control systems, for example, action by the computer need only take place at infrequent intervals of time. One such example is that of the temperature sensor microcontroller which is coupled to an environmental control system in a building. For a temperature sensor, the building temperature may only need to be sampled at intermittent intervals (for example, once every five minutes) in order to issue the necessary signal to the heating/cooling system to compensate for variations in temperature. In this case, intermittent sampling is sufficient because instantaneous response to fluctuations in temperature is not necessary (hopefully the building will retain the temperature from a previous heating or cooling cycle for a certain interval of time). For the most part, because this unit remains idle between samples, and because on-board battery power may be used, it is desirable to put the computer into a mode where minimum power is consumed. This will allow operation in environments where power usage should be minimized, such as in an automobile. In an environmental control application for a building, for example, because many control units may be distributed throughout an entire system, power consumption for the system may be reduced.

Dynamic logic LSI (large-scale integrated) circuits are typically used in computers due to their low cost, small area requirements, and adequate performance for most applications. Dynamic logic devices, and memories in particular, use charged capacitors which must be recharged at regular intervals due to capacitor leakage. Dynamic logic devices therefore require the use of "refresh" circuitry in order to recharge these capacitors at certain minimum intervals to retain their data. A minimum refresh frequency for some dynamic memory devices (DRAM) is approximately 500 kilohertz (KHz). Because a computer comprised of dynamic logic components requires the use of refresh circuitry which operates continuously to retain the data, power is used constantly even when no instructions are being executed by the computer system. Moreover, because these devices must be refreshed at regular intervals, a system clock must be maintained. This clock also consumes power, even when no instructions are being executed. In an application which requires minimum power consumption, such as one powered by a battery and/or one which does not operate continuously, the use of dynamic logic devices along with the required clock and refresh circuitry provides a design that consumes more power than might otherwise be desired.

SUMMARY AND OBJECTS OF THE INVENTION

One of the objects of the present invention is to provide a computer architecture which minimizes power consumption during idle periods but yet is still fairly compact and inexpensive.

Another object of the present invention is to provide a method for suspending processing within a computer in such a way that critical data is not lost between the time when processing was suspended and the time when normal operation resumes.

These and other objects of the present invention are provided for by a computer architecture capable of retaining data after a system clock has been halted to conserve power. The computer comprises first processing circuitry, the first circuitry comprising dynamic components. In a preferred embodiment, the dynamic components include such devices as intermediate pipeline registers, arithmetic logic units, address generators, and instruction decode and control circuitry. The computer further comprises second processing circuitry, the second circuitry comprising static components. In a preferred embodiment, the static components comprise instruction registers, stop controls, general purpose registers, status registers, and random access memory. The use of dynamic components in the architecture of a preferred embodiment minimizes cost and size, while the static components allows instruction execution and the system clock to be halted. The combination of dynamic and static components preserves information to enable the system to resume execution after the system clock has been stopped without critical data loss. This architecture reduces power consumption compared to a system implemented entirely in dynamic logic, while minimizing cost and area.

These and other objects of the invention are provided for by a method of suspending operation of a pipelined computer architecture in order to resume processing at a later time without critical data loss. The pipelined computer architecture comprises a first portion comprised of dynamic logic components, and a second portion comprised of static logic components. The first portion comprises a pipeline in the computer architecture and the second portion comprises random-access memory and central processing unit registers. The method comprises detecting a suspend operation signal. After the suspend operation signal is detected, loading of instruction and status registers is prevented. Then, no-operation commands are executed for each stage in the pipeline. In a preferred embodiment, this cycles critical data through to circuitry implemented in static logic, and ensures that no data is lost until the computer resumes instruction execution. Then, general purpose registers and random access memory are prevented from being modified and the system clock is halted. This conserves system power without critical data loss until, in a preferred embodiment, the system clock is restarted.

These and other objects of the present invention are provide for by a method of resuming operation of a pipelined computer architecture, wherein the pipelined computer architecture comprises a first portion comprised of dynamic logic components, and a second portion comprised of static logic components. The first portion comprises the pipeline in the computer architecture and the second portion comprises random-access memory and central processing unit registers. The method comprises detecting a resume operation signal, and then permitting loading of instruction and status registers at the appropriate time. No operation commands are executed for each stage in the pipeline. Loading of general purpose registers and random access memory are then permitted and the system clock is restarted, resuming operation in the same place where execution was halted. Critical data has been retained, and the pipeline contains valid data, allowing normal computer operation.

BRIEF DESCRIPTION OF DRAWINGS

The present invention is illustrated by way of example and not limitation in the figures of the accompanying in which like references indicate similar elements and in which:

FIG. 2 shows the contents of various stages in the pipeline corresponding with three central processing units used in the architecture shown in FIG. 1.

DETAILED DESCRIPTION OF THE PREFERRED EMBODIMENT

An architecture and method for minimum power consumption in a computer is described. In the following description, for the purposes of explanation, specific numbers, central processing units, registers, addresses, times, and signals are set forth in order to provide a thorough understanding of the present invention. It will be apparent to one skilled in the art, however, that the present invention may be practiced without some of these specific details. Well known circuits and devices are shown in block diagram form in order to not unnecessarily obscure the present invention.

Figure 1:
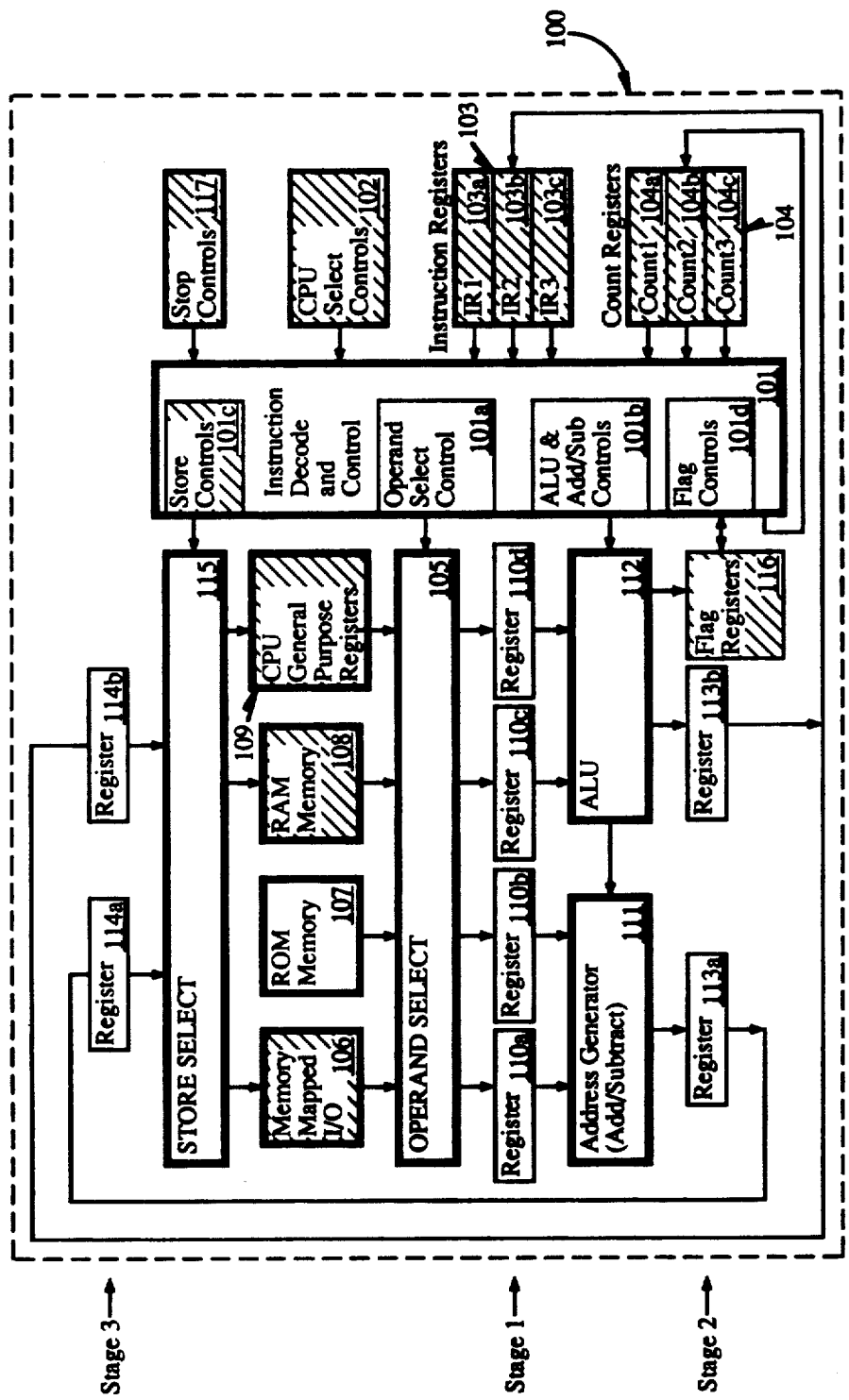
FIG. 1 shows an architecture of the preferred embodiment of the present invention.

FIG. 1 shows a computer architecture of the preferred embodiment. Computer architecture 100 shown in FIG. 1 may be used in a networked control system, such as a house. One such network is referred to in Markkula, Jr., et al., "Network and Intelligent Cell for Providing Sensing, Bidirectional Communications and Control," U.S. Pat. No. 4,918,690, which is assigned to the assignee of the present invention. Of course, the present invention has equal application in non-networked computer systems, as will be appreciated by one skilled in the art. Computer architecture 100 is broken into many component parts ("blocks") each representing circuitry contained within architecture 100. System 100 is a pipelined computer architecture with three central processing units (CPU's) which optimizes throughput and performance. One main component of system 100 is instruction decode and control block 101. Instruction decode and control block 101 is controlled by four blocks 102, 103, 104, and 117. CPU select controls 102 determines which CPU instruction register 103 and count register 104 will be selected for instruction generation. There are three count registers 104a, 104b, and 104c, and three instruction registers 103a, 103b, and 103c to indicate the stage of instruction execution the selected CPU is in. There is one count register and one instruction register for each CPU. CPU select controls 102 merely cycles through each CPU on each instruction cycle. On each instruction cycle, a different CPU is selected for address generation and computation. CPU select controls 102 sequentially steps through, selecting each CPU for instruction generation and execution. Therefore, every three cycles, the same CPU is selected for instruction decode and execution. Block 101 is also controlled by stop controls 117 which indicates to block 101 that instruction execution should be suspended (the system should "sleep") until execution is resumed at a later time. A "wake-up" (resume execution) command is also issued by stop controls 117. A "sleep" halts the system clock, and is discussed in more detail below. A "wake-up" restarts the system clock.

Operand select controls are generated by 101a within block 101 to control operand select 105. Operand select 105 determines which of the memories 106–109 presents its data to pipeline registers 110a–110d. Each of the registers 110a–110d are known as the stage one registers and receive data from either memory mapped I/O block 106, ROM (read-only) memory 107, RAM (random access) memory 108, or CPU general purpose registers 109. One or more of these memory units 106–109 is selected via operand select block 105, which is then put into registers 110a–110d (stage one) of the pipeline of system 100. The output of each of these stage one registers 110a–110d is presented to address generator 111, and arithmetic logic unit (ALU) 112. Addresses and data output from address generator 111 and ALU 112 is controlled by control block 101b in block 101. Address generator 111 computes address information, and ALU 112 computes data information. ALU 112 also passes fetched instruction to instruction registers 103a–103c. Controls issued by block 101b indicate the appropriate operation to take place. Controls issued by block 101b are determined by the selected CPU instruction registers 103, and central processing unit count registers 104. Address generator block 111 uses registers 110a and 110b located in the stage one registers to compute an address where data is to be stored or read from. If an addition or subtraction operation must take place to compute the address (for example, an indexed instruction which uses an index register and a base register) then the address is computed accordingly and passed to the stage two register 113a which holds the computed operand address. In addition, an operand may be held in registers 110c and 110d for a computation performed by ALU 112. Once ALU 112 has performed a computation, the operand is passed to stage two register 113b, and/or certain bits are set in flag registers 116 shown in FIG. 1. This may indicate, for example, the result of a compare operation or other status information. For example, if a compare operation is performed by ALU 112, registers 110c and 110d may contain the data being compared. Then, specific bits in flag registers 116 may be set to indicate the results of this compare. This information will then be passed back to flag controls 101d located in instruction decode and control block 101. The results of the ALU 112's operation, if there are any, are placed into register 113b which also resides at stage two of the pipeline.

Information computed by address generator 111 and/or ALU 112 is passed to stage two registers 113a, 113b, and flag registers 116. This information is then passed to the stage three registers 114a and 114b shown in FIG. 1 at the next instruction cycle. Information computed by ALU 112 and placed into register 113b is also made available to instruction registers 103a-103c when ALU 112 is used to fetch an instruction. Data contained in the stage three pipeline registers 114a and 114b can then be stored in any of the memory blocks 106, 108, or 109 according to which of these devices is selected by store select block 115. Store select block 115 is controlled by the store controls 101c in block 101.

The pipeline architecture of the preferred embodiment shown in FIG. 1 facilitates multiprocessing by allowing the data for one central processing unit to be contained in one stage of the pipeline, and data for another CPU to be contained in a previous or a subsequent stage of the pipeline. Instruction decode and control block 101 will sequentially select, via CPU select controls 102, each CPU such that data at each stage of the pipeline corresponds to one central processing unit. Once every three cycles, one particular central processing unit will be selected to control the functioning of each block in a particular stage of the pipeline. This is graphically represented in FIG. 2. During time period one, as shown in FIG. 2, CPU 1 will control registers in stage one of the pipeline (registers 110a-110d). Stage two in the pipeline (registers 113a and 113b) will contain information processed by CPU 3, and stage three of the pipeline (registers 114a and 114b) will contain information processed by CPU 2. When processing is complete for all the stages during time period one, execution will proceed to time period two. At time period two, data for CPU 2 will reside in stage one of the pipeline. Data for CPU 1 will reside in the stage two pipeline registers, and data for CPU 3 will now reside in the stage three pipeline registers. The stage one pipeline registers will receive data from operand select block 105 shown in FIG. 1, which corresponds to CPU 2 at time period two. Advancing to time period three, data which was contained in the stage two pipeline registers will be passed along to the stage three pipeline registers. This data is processed by CPU 1, and data for CPU 2 will be passed along to the stage two pipeline registers. Data for CPU 3 will be received from operand select block 105 shown in FIG. 1 and placed into the stage one pipeline registers 110a-110d. Advancing to time period four, the data is advanced one more stage in the pipeline. CPU 1 data will be received from operand select block 105 and placed in the stage one pipeline registers 110a-110d. Data for CPU 3 will be in the stage two pipeline registers, and data for CPU 2 will be in the stage three pipeline registers. This process continues for as long as system 100 is executing instructions.

System 100 is implemented using a combination of dynamic logic and static logic circuitry. Certain blocks shown in FIG. 1 are identified as "critical blocks" and are implemented using static logic circuits. These are shown shaded in FIG. 1. A critical block is one which must contain valid data even after the system clock has been halted. This allows system 100 to be restarted at a later time and resume execution at the same place where execution was stopped without data loss. This allows certain status fields such as flags, instruction and CPU counters and data residing in certain memory devices to be retained for the period in which the system clock is stopped. This allows execution to resume at a later time when the clock is restarted. The critical blocks will be in a determinant state and no data will be lost. The remaining unshaded blocks, known as "non-critical" blocks, need not be in a determinant state when the system clock is restarted. The non-critical blocks are therefore implemented in dynamic logic to conserve space and reduce cost. Data residing in critical blocks will be retained, for as long as system power is present even if the system clock is stopped. Data in blocks which are unshaded will be lost because those blocks are implemented in clocked dynamic logic and go to an indeterminant state when the system clock is halted. This is because no refreshing of those dynamic circuits may take place when the system clock is stopped. For a given period of time, critical blocks draw less power than that required by clocked dynamic circuitry of equivalent function because they require no refreshing.

In the preferred embodiment, memory mapped input/output area 106, RAM memory 108, CPU registers 109, flag registers 116, count registers 104, instruction registers 103, CPU select controls 102, store controls 101c and stop controls 117 are all implemented in static logic. The data contained in these critical blocks is thus retained even when the system clock is stopped. Halting the system clock is called putting the computer to "sleep." While sleeping, the data retained in dynamic circuitry will be lost (become indeterminant) because the system clock is not operating and thus no refreshing can take place. The data will be retained, however, by those blocks implemented in static logic because they do not need to be refreshed. Because no refresh of static logic is required, a minimal amount of power is drawn to preserve the data in the critical blocks. Also, because the system clock of 100 is not running, 100 draws less power than an architecture implemented entirely in clocked dynamic logic. In addition, cost and the area occupied by 100 has been minimized in 100 because some of the circuitry is implemented in dynamic logic. System 100 therefore occupies less space than an architecture implemented entirely in CMOS static logic. Because of the pipeline architecture of 100 shown in FIG. 1, however, care must be taken to ensure that critical data is put into critical blocks prior to stopping the system clock. Put another way, none of the intermediate stage one, stage two, or stage three pipeline registers should contain data which needs to be retained while the 100 is sleeping. Also, care must be taken when restarting the system clock to ensure that the intermediate pipeline registers contain valid data. A method of preparing system 100 to sleep (stop the system clock) and awake (restart the system clock) is therefore required.

Because critical data must reside in critical blocks and non-critical blocks should not contain critical data prior to halting the system clock, a method is required to "flush" the pipeline of system 100 prior to sleeping. When a sleep cycle is initiated, all of the central processing units in the system begin to execute NOP's (no operation commands) repetitively until the pipeline of 100 is flushed. The critical blocks will therefore contain data which must be retained until 100 resumes execution of instruction. A NOP consumes one instruction cycle and causes a CPU to not modify any data in system 100. However, data contained in intermediate stage registers will be processed normally through system 100. This data will be allowed to propagate throughout the system until critical data has reached critical blocks. NOP commands will then reside in the intermediate stage pipeline registers. Because the non-critical blocks are implemented in dynamic logic (which includes the pipeline registers), when the system clock is halted, the pipeline registers will go to an indeterminant state. Because these registers contain NOP data only, this has no effect on restarting system 100. A more detailed description of the process of halting and resuming execution of instructions by computer 100 is shown in FIGS. 4a and 4b.

Figure 4A:
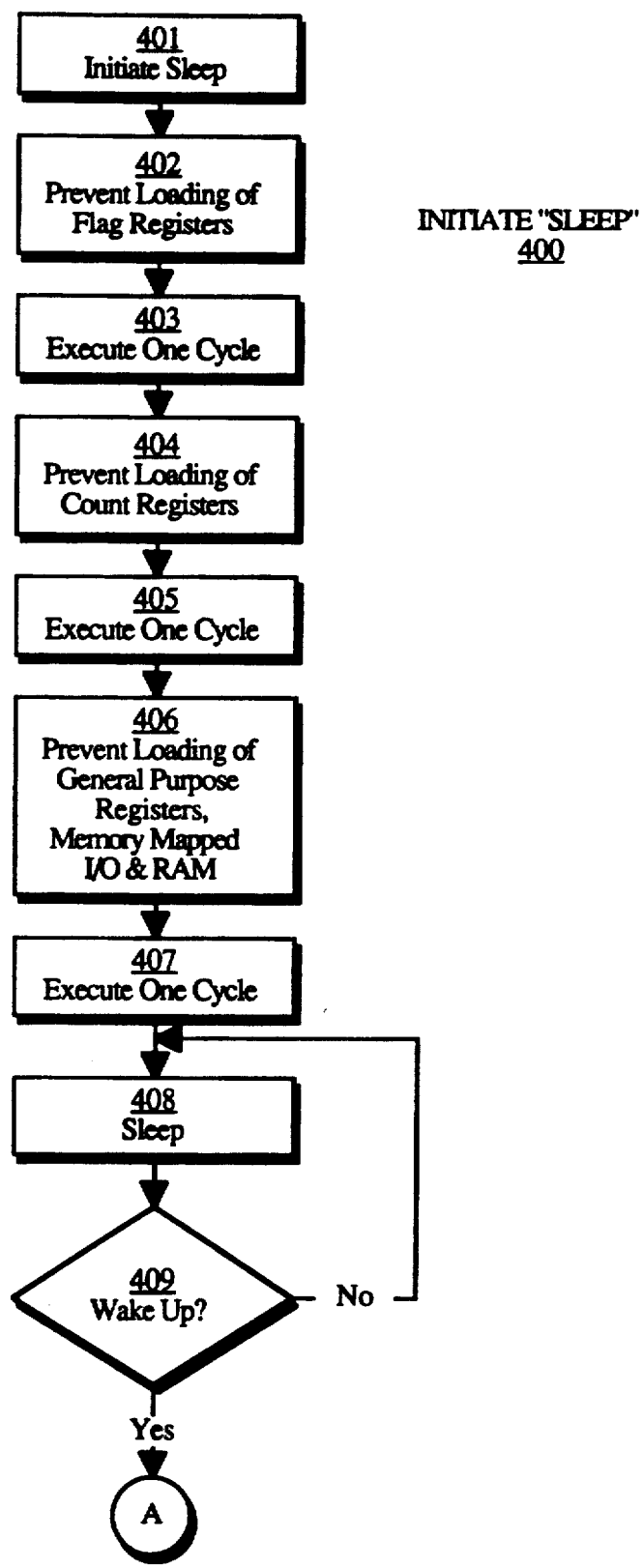
FIGS. 4a show a process used for preparing to halt the system clock, for a system "sleep" or low power consumption idle state.
Figure 4B:
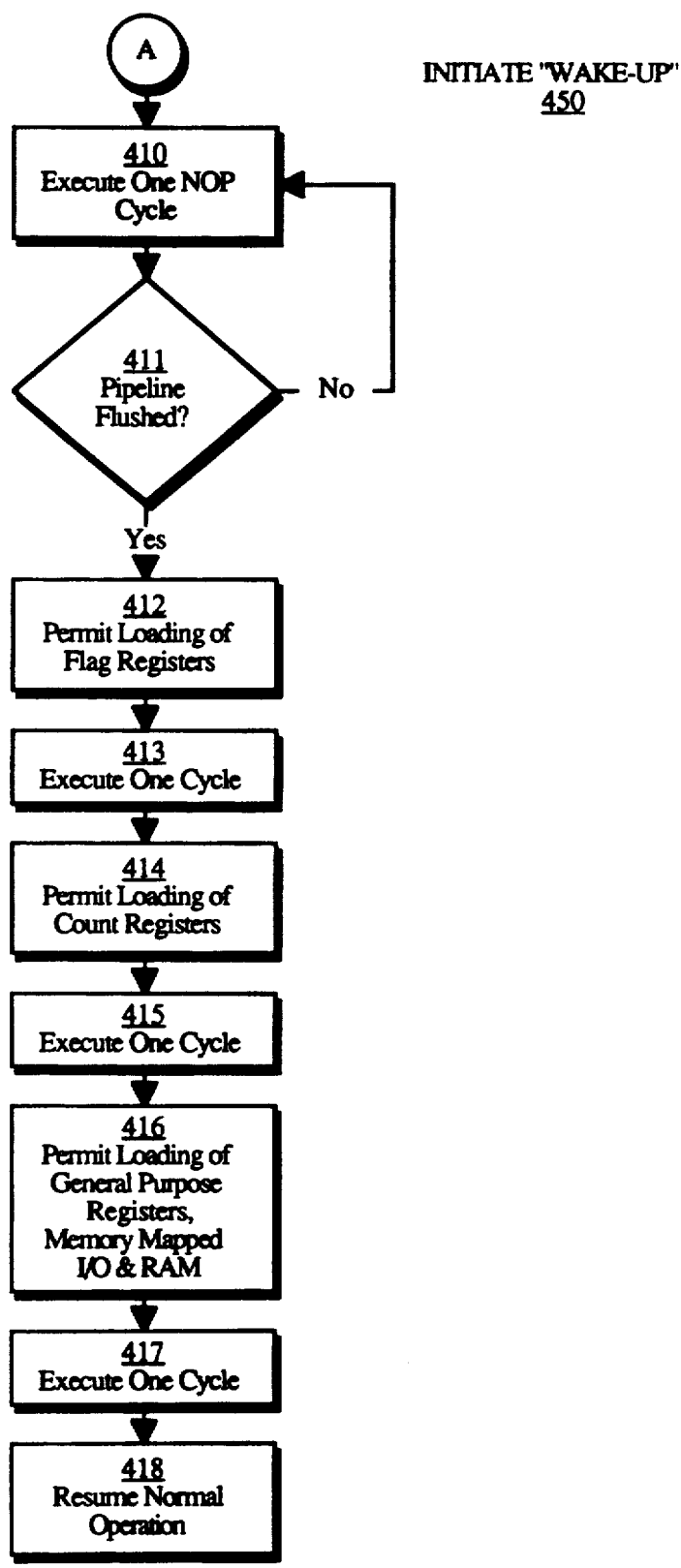
FIG. 4b shows a "wake-up" method used for resuming normal operation after an idle or "sleep" state.

Process 400 shown in FIG. 4a ensures that the pipeline is adequately flushed prior to stopping the system clock of processor 100 and initiating a "sleep.". It should be noted that 400 is used in a three-stage pipelined architecture such as 100 shown in FIG. 1, and it may not be appropriate for another system having more or less than three stages of pipelines or one which has the pipeline structured in a different way. It will be apparent, however, to one skilled in the art that processes 400 and 450 in FIGS. 4a and 4b may be modified for use in other systems having pipelined architectures with different numbers and/or arrangements of stages. 400 in FIG. 4a initiates the "sleep" at step 401. The initiate "sleep" command is issued by stop controls 117 in FIG. 1. The appropriate command may be issued by stop controls 117 when a flag or a register goes to a predefined state or when a specific period of time has elapsed since the last "sleep" cycle. Stop controls 117 may include a timer to allow this to occur. Of course, a "sleep" may be initiated by another event (or lack of an event), such as user input, or the triggering of an external device. A variety of ways to initiate the sleep are contemplated within the spirit and scope of this invention. The charge in stop controls 117 is detected by instruction decode and control block 101. Once an initiate "sleep" command is issued to instruction decode and control block 101, system 100 prevents the loading of the flag registers 116 at step 402. This ensures that flag registers 116, which contain status information, are not modified in any way prior to stopping the system clock. Then, one NOP (no operation) command is executed by the CPU now processing the first stage pipeline registers. Critical data formerly contained in the stage one registers 110a-110d moves to the stage two registers 113a-113b at step 403. At step 404, count registers 104 are then prevented from receiving new data. This ensures that instruction execution resumes at the proper stage in the instruction cycle for the data now contained in stage two registers 113a and 113b. At step 405, one more NOP is fed into the pipeline and an instruction cycle is executed, to transfer the data in the stage two registers 113a and 113b to stage three registers 114a and 114b. Data which was in the first stage pipeline registers when the sleep was initiated should now be stored in the critical blocks 106-109, and thus will be retained for as long as the "sleep" takes place. At step 406, CPU general purpose registers 109 and memories 106 and 108 are prevented from receiving new data. This ensures that GP registers 109, RAM memory 108 and memory mapped I/O 106 retain data corresponding with the last non-NOP command executed prior to initiating the "sleep." Then, at step 407, the third NOP cycle is executed. Once this has been done, three NOP's have been executed (one for each processor), thus flushing the pipeline and critical data is retained in critical blocks.

The first, second and third stage registers in system 100 now contain non-critical data. The system clock may then be halted allowing data in these non-critical intermediate stage pipeline registers to go to an indeterminant state. This is satisfactory because all the data which is required to restart the system now resides in critical blocks 106-109, 116, 117, 101c, 102, 103, and 104. Normal system operation may resume in the place where execution was suspended at any time once a "wake-up" signal is issued. Therefore, process 400 terminates by stopping the system clock, and sleeping at step 408. System 100 stays asleep until a "wake-up" command has been issued by stop controls 117 as detected at step 409. All critical blocks in system 100 now are in a determinant state, and will remain that way as long as system power is not lost during the sleep.

The pipeline in system 100 may be refilled with data and recommance normal operation when a "wake-up" is issued. The sleep may last any period of time, as long as system power continues. As a result of the architecture of 100, space, complexity, cost, and power consumption requirements are all maximized. The present architecture and methods have equal application in situations where certain minimum clock frequencies cannot be maintained.

A "wake-up" sequence is shown as process 450 in FIG. 4b. Again, as discussed with the initiate "sleep" shown in FIG. 4a, an initiate "wake-up" is issued by stop controls 117. As discussed previously, stop controls 117 may comprise a timer or other device to cause a "sleep" on predetermined intervals or events. Many "wake-up" conditions are contemplated within the spirit and scope of this invention. The "wake-up" command is detected in process 400 of FIG. 4a, wherein 409 will branch to 410 in FIG. 4b. Once a "wake-up" command is detected, process 450 commences wherein one NOP cycle will be executed at step 410. Step 411 determines whether the pipeline has been flushed. 410 and 411 are executed until the pipeline is completely flushed of indeterminant data (data which was in the pipeline before the sleep). Once complete, step 411 proceeds to step 412 which now permits loading of the flag registers 116 shown in FIG. 1. Then, one instruction cycle is executed at step 413, wherein information is loaded from critical blocks 106-109 into the first stage registers 110a-110d. Then, at step 414, the loading of count registers 104 is now unblocked. Instruction cycle counting may resume. This resumes instruction execution in the last cycle where the last instruction (according to the instruction registers 103) was suspended. At step 415, another instruction is executed allowing the data currently residing in the stage one registers 110a-110d to be passed along to the stage two registers 113a and 113b. Then, loading of general purpose registers 109, RAM memory 108 and memory mapped I/O area 106 are permitted at step 416. One more instruction cycle is then executed at step 417 in order to load the stage three registers 114a and 114b with the data which would have been in them had the "sleep" not been initiated in process 400. In other words, data which was contained in the stage one registers 110a-110d will cycle through the pipeline until data has been now reloaded into the stage three registers 114a and 114b. Normal operation of system 100 may now resume at step 418. Process 450 ensures that critical data has been retrieved from critical blocks such as 106-109 and cycled through the pipeline to the same state that system 100 was in prior to sleeping. Therefore, instruction execution resumes at the same place where it was suspended.

Given architecture 100 shown in FIG. 1, it is necessary to use techniques similar to those shown in FIGS. 4a and 4b in order to properly stop the system clock and preserve the integrity of critical data which was formerly in the pipeline. Process 400 set forth in FIG. 4a ensures that critical data is put into critical blocks prior to halting the system clock. In addition, process 450 set forth in FIG. 4b ensures that the pipeline is filled with critical data prior to resuming instruction execution and restarting the system clock. Other methods may be used in a system comprised of a combination of dynamic and static logic, and which ensures critical data is in the pipeline prior to resuming operation. These other methods are contemplated within the spirit and scope of this invention. Of course, alternative structures for a computer may be used such as implementing the entire computer architecture in static logic. A computer implemented entirely in static logic does not require flushing and refilling the pipeline as set forth in FIGS. 4a and 4b, because the entire system will retain its data even when the clock is stopped. Data will be retained in intermediate stage pipeline registers in this embodiment, however, space, cost and size constraints may limit its application. The preferred embodiment maximizes these these goals, while minimizing power consumption.

Figure 3:
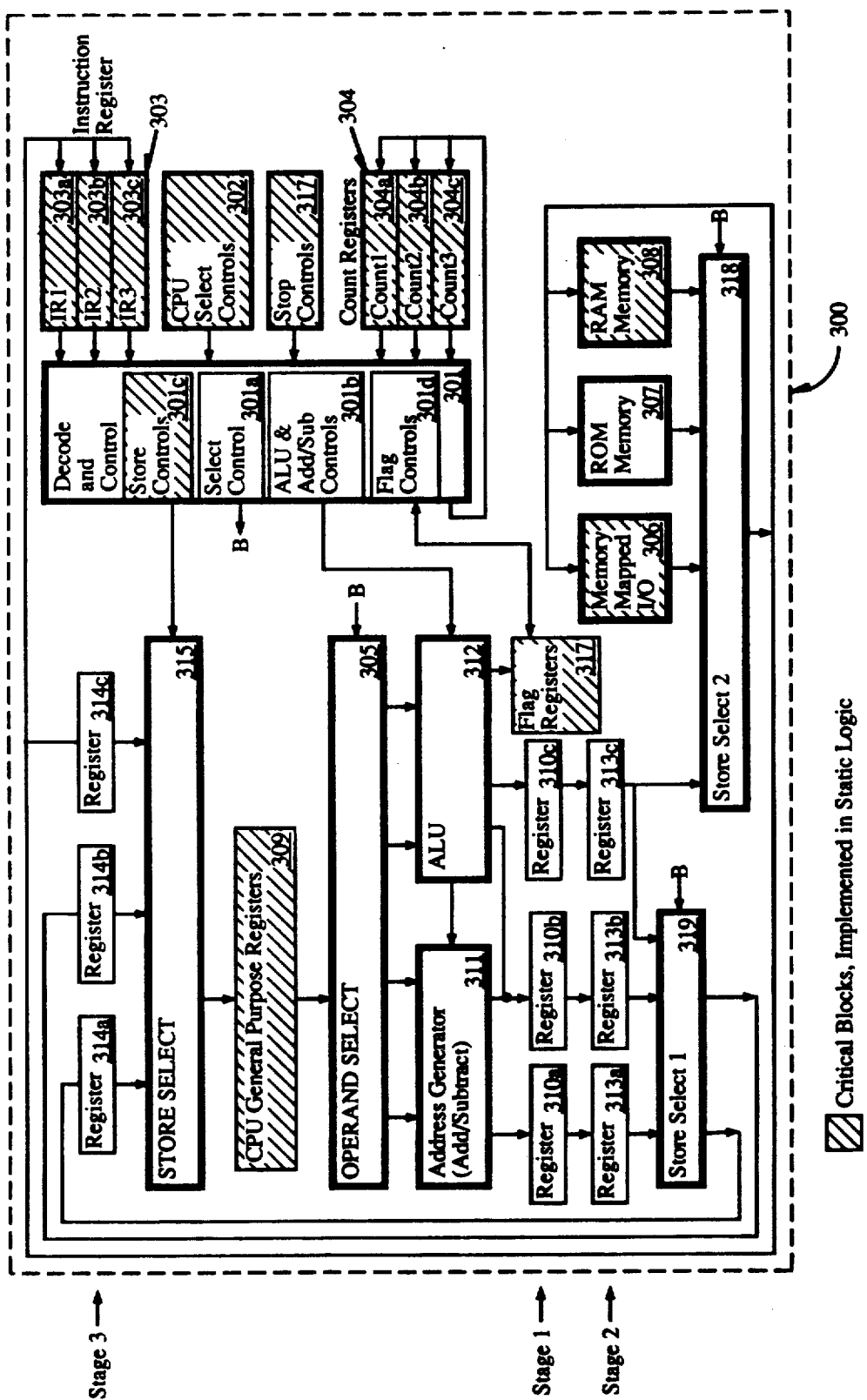
FIG. 3 shows an alternative embodiment of the architecture of the present invention.
Figure 5A:
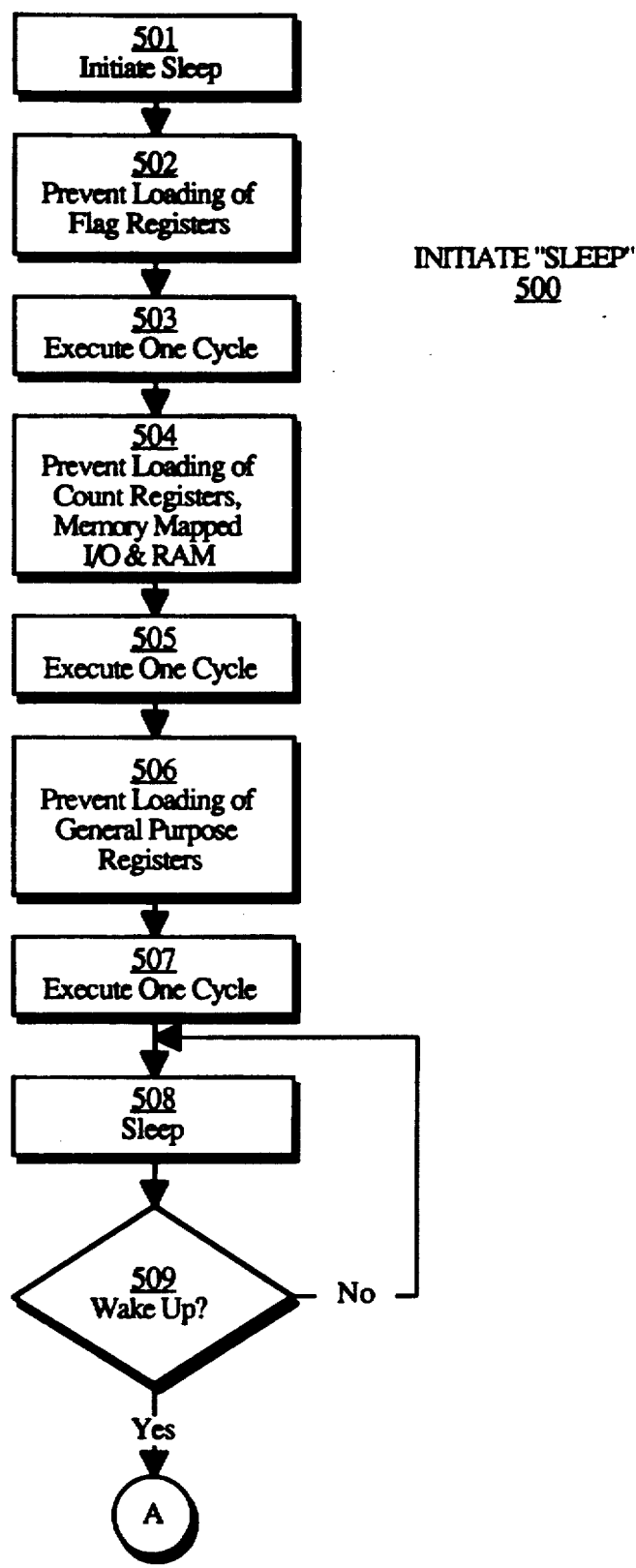
FIG. 5a shows a process for putting to "sleep" an alternative embodiment of the present invention.
Figure 5B:
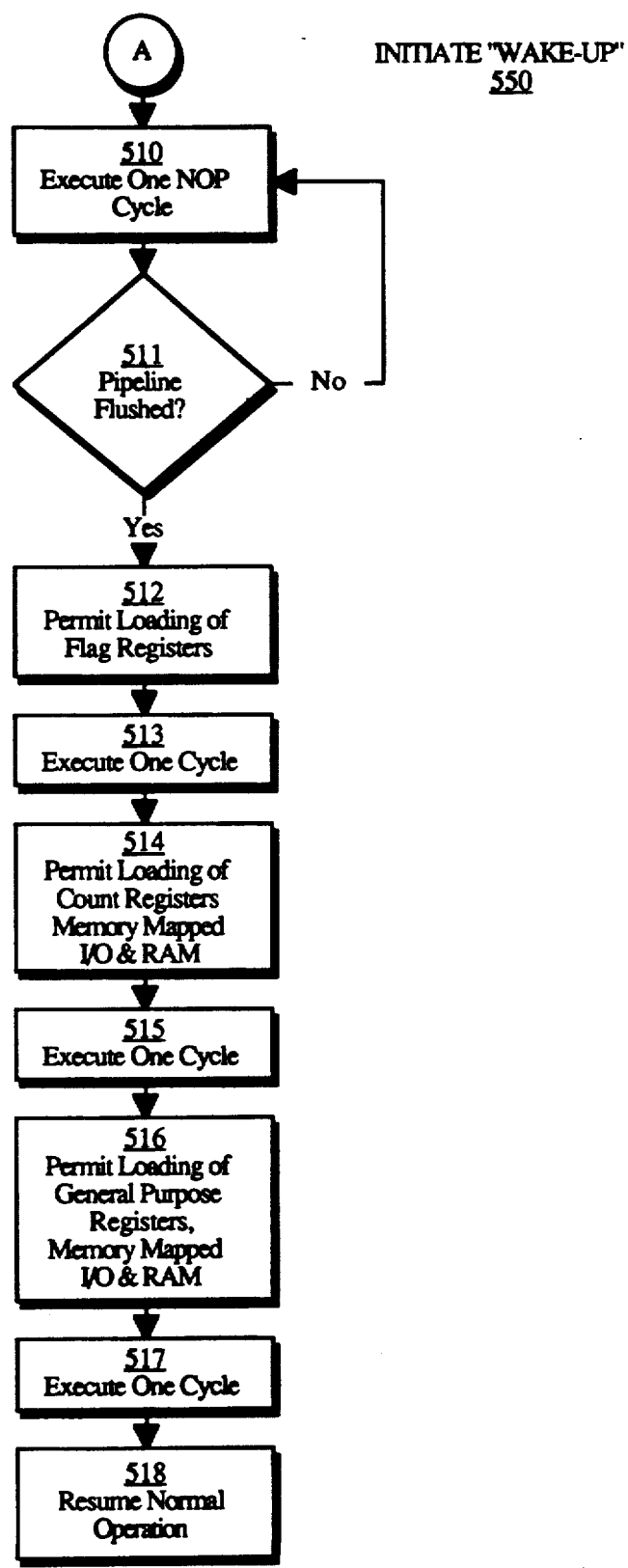
FIG. 5b shows a process for "waking-up" an alternative embodiment of the present invention.

Another alternative embodiment of the present invention is shown in FIG. 3 as 300. 300 has a similar architecture to that shown in 100 wherein certain critical blocks of the system are implemented in static logic, shown shaded in FIG. 3. Other major system components are implemented in dynamic logic to conserve space and reduce the cost of system 300. Because 300 uses a mixture of dynamic and static logic, as with 100, processes similar to 400 and 450 must be executed in order to halt and restart the system clock. This ensures that valid instructions and/or data only is present in the pipeline. These processes will be discussed with reference to FIGS. 5a and 5b.

As discussed with reference to FIG. 1, an initiate sleep operation will be issued by stop controls 317 to instruction decode and control block 301. As discussed previously, stop controls 317 may be operative upon activation of a timer or other device. In process 500 shown in FIG. 5a, the "initiate sleep" command 501 is detected, and step 502 is performed which prevents the loading of the flag registers 317 in architecture 300. This prevents any status conditions from being changed. One NOP command is performed at step 503 cycling through the data which may currently reside in the stage one registers 310a-310c to the stage two registers 313a-313c. Then, the instruction cycle count registers 304a-304c, memory mapped I/O area 306 and RAM memory 308 are prevented from receiving new data at step 504. Instruction count registers 304a-304c are prevented from loading because, when execution resumes, the instructions should continue at the appropriate phase in instruction execution. Memories 306 and 308 are protected to ensure that valid instructions are preserved. At step 505 one more NOP is executed in order to cycle critical data in the pipeline from the stage two registers 313a-313c to the stage three registers 314a-314c. Loading of general purpose registers 309 is then prevented at step 506. Again, because CPU general purpose registers 309 are a critical block, their loading should be prevented to allow restart of processor execution at a determinant state. Finally, one additional NOP instruction is executed at step 507. At this time, all critical data has been stored in critical blocks such as CPU general purpose registers 309, flag registers 317, or either of the storage memories 306 or 308. Once this last operation has been performed, the system clock may be halted, and the system sleeps at step 508, minimizing power consumption in architecture 300. Sleep continues at steps 508 and 509 until the "wake-up" is initiated by stop controls 317. Because store controls 301c, instruction registers 303, CPU select controls 302, count registers 304, general purpose registers 309, flag registers 317, memory mapped I/O storage 306, and RAM memory 308 are all implemented in static logic, architecture 300 will retain the data contained in those critical blocks until such time as the system clock is restarted and architecture 300 resumes instruction execution.

As discussed with reference to FIG. 1, process 550 is executed prior to resuming operation in system 300. Once a "wake-up" is detected from stop controls 317 at step 509 in FIG. 5a, process 500 proceeds to 550 in FIG. 5b. This process places the system in a determinant state into which normal processor execution may resume. Steps 510 and 511 are performed in order to make sure that the pipeline has been adequately flushed prior to permitting loading of various critical blocks in the system. Once this has been done, the loading of critical blocks may then resume. Step 510 executes NOP commands until the pipeline has been completely flushed. Once this has been done, step 511 leads to step 512 which permits the loading of flag registers 317. An additional NOP is executed at step 513 in order to allow information contained in the critical blocks to be passed along to the stage one pipeline registers 310a-310c. The loading of the count registers is permitted at step 514 so that normal processor execution may resume at the proper place in the instruction cycle. The loading of RAM memory 308 and memory mapped I/O area 306 is permitted at this time also. An additional NOP cycle is performed at step 515 allowing the loading of the stage two pipeline registers 313a-313c. Finally, the loading of general purpose registers 309 is permitted at step 516, and one additional instruction cycle is executed in order to allow the final stage stage three registers 314a-314c to contain critical data at step 517. Normal operation of system 300 may then resume at step 518. By executing the steps set forth in process 550 of FIG. 5b, data which was stored in critical blocks has been allowed sufficient time to propagate through the pipeline of architecture 300. Thus, valid data resides in the entire pipeline and execution may resume at the same place where the clock was stopped.

Thus, a method and apparatus for power conservation in a computer system architecture has been described. Although the present invention has been described particularly with reference to FIGS. 1-5b, it will be apparent to one skilled in the art that the invention has utility far exceeding that disclosed in the figures. It is contemplated that many changes and modifications may be made, by one of ordinary skill in the art, without departing from the spirit and scope of the invention as disclosed above.

What is claimed is:

1. A pipelined computer architecture capable of retaining data after a system clock has been halted thus conserving power, said architecture comprising a plurality of processing units coupled to shared resources, the architecture comprising:
- a. first circuitry, the first circuitry comprising dynamic components including a compuer pipeline, arithmetic logic unit, instruction decoder, and address generator which is shared among and coupled to the plurality of processing units; and
- b. second circuitry coupled to said first circuitry, the second circuitry comprising static components, including central processing unit registers, instruction counters, status registers, random access memory and computer stop controls, said computer stop controls including:
  - i. means for detecting the issuance of an execution suspend signal, said pipeline being in a first state including instructions which may not be complete,
  - ii. means responsive to said execution suspend signal detection means for preventing modification of said second processing circuitry:
  - iii. means responsive to said execution suspend signal detection means for advancing data in the pipeline all stages through the pipeline without modifying said second processing circuitry,
  - iv. means for stopping a computer system clock which provides a timing reference for said first processing circuitry responsive to the completion of said advancing pipeline means;
  - v. means for detecting the issuance of an execution resume signal;
  - vi. means responsive to the execution resume signal detection means for restarting said computer system clock;
  - vii. means responsive to the execution resume detection means for advancing the pipeline a first number of stages until said pipeline is restored to said first stage;
  - viii. means for allowing modification of said second processing circuitry responsive to the execution resume signal detection means; and
  - ix. means for resuming execution of instructions in said system responsive to the execution resume signal detection means.

2. The apparatus of claim 1 wherein the computer pipeline comprises three stages.

3. The apparatus of claim 2 further comprising a separate central processing unit for each stage in the pipeline.

4. The apparatus of claim 3 wherein each said separate central processing unit processes data in each said stage of the pipeline.

5. A multiprocessing unit architecture comprising:
- a. a plurality of central processing units, each of said central processing units comprising an instruction register;
- b. shared resources coupled to each of said plurality of central processing units including an arithmetic logic unit (ALU), instruction decoder, pipeline, random access memory and general purpose registers;
- c. critical regions coupled to each of said plurality of central processing units for storing the state of each of said plurality of central processing units;
- d. stop controls coupled to each of said plurality of central processing units, said stop controls including:
  - i. means for detecting the issuance of an execution suspend signal, said pipeline being in a first state including instructions which may not be complete,
  - ii. means responsive to said execution suspend signal detection means for preventing modification of critical areas in said architecture;
  - iii. means responsive to said detection means for advancing data in the pipeline through all stages in the pipeline without modifying said critical areas in said architecture,
  - iv. means for stopping a computer system clock responsive to the completion of said advancing pipeline means;
  - v. means for detecting the issuance of an execution resume signal;
  - vi. means responsive to the execution resume detection means for restarting said computer system clock;
  - vii. means responsive to the execution resume detection means for advancing the pipeline a first number of stages until said pipeline is restored to said first state;
  - viii. means for allowing modification of said critical areas of said architecture responsive to the execution resume signal detection means; and
  - ix. means for resuming execution of instructions in said system.

* * * * *

UNITED STATES PATENT AND TRADEMARK OFFICE
CERTIFICATE OF CORRECTION

PATENT NO.    :   5,203,003
DATED         :   April 13, 1993
INVENTOR(S)   :   Robert W. Donner It is certified that error appears in the above-identified patent and that said Letters Patent is hereby corrected as shown below:

In column 11 at line 41 delete "stage" and insert --state--

Signed and Sealed this

Fourteenth Day of October, 1997

Attest:

BRUCE LEHMAN

Attesting Officer

Commissioner of Patents and Trademarks